UNITED STATES PATENT OFFICE.

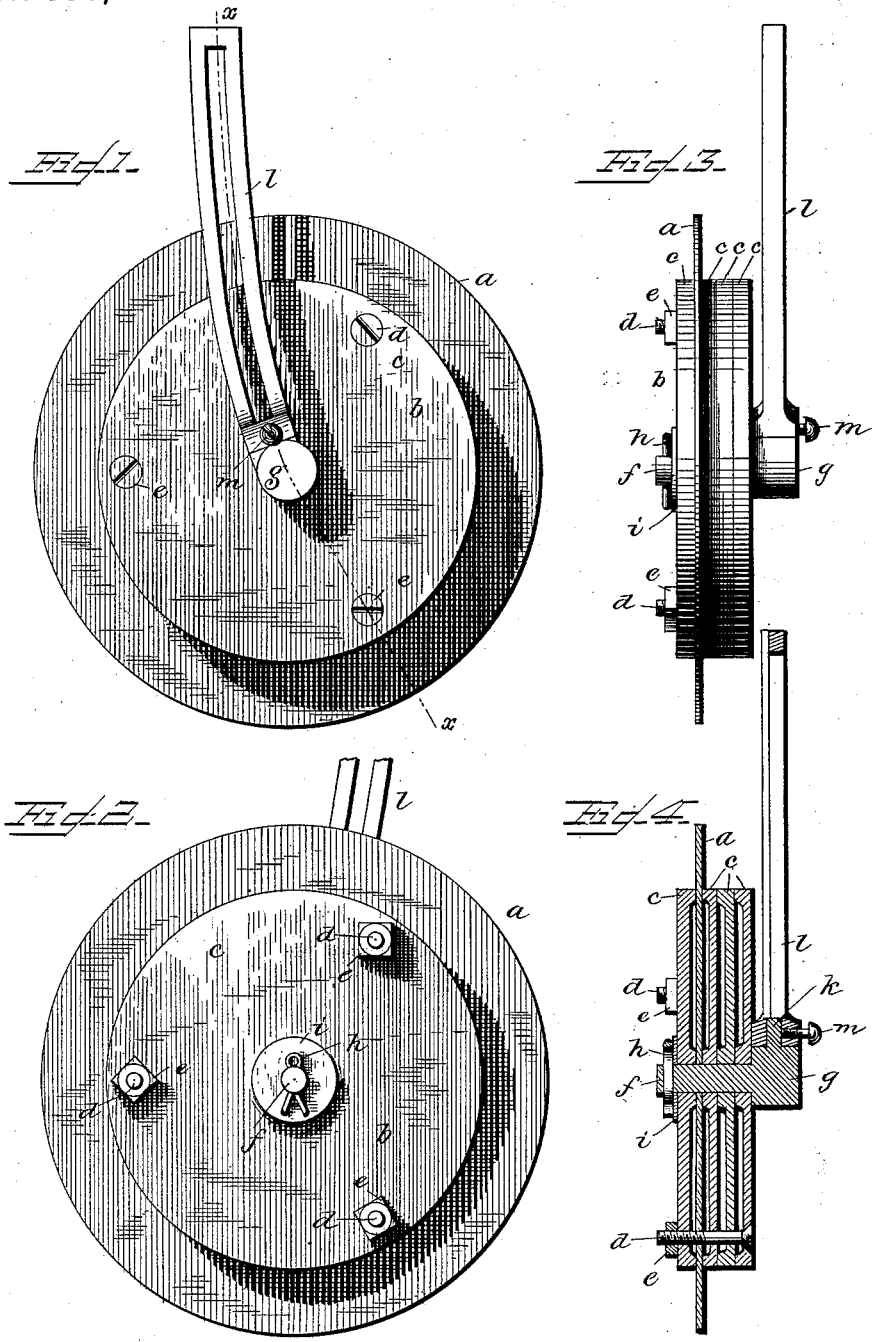

HARRY A. CROSSLEY, OF ROCKPORT, OHIO, ASSIGNOR TO CECELIA S. CROSSLEY, OF SAME PLACE.

COMBINED GAGE-WHEEL AND COLTER.

SPECIFICATION forming part of Letters Patent No. 336,475, dated February 16, 1886.

Application filed November 4, 1885. Serial No. 181,826. (No model.)

*To all whom it may concern:*

Be it known that I, HARRY A. CROSSLEY, a citizen of the United States, residing at Rockport, in the county of Cuyahoga and State of Ohio, have invented a certain new and useful Combined Gage-Wheel and Colter, of which the following is a full, clear, and exact description.

The object of this invention is to provide a combined colter and gage-wheel for plows, in which the colter may be adjusted so as to bring it in line with the vertical wall or edge of the landside of the plow, the combined wheel and colter having an axle which is rotarily adjustable on its bracket, so as to insure the rolling of the wheel and colter in a direct line with the plow.

The invention consists in a colter combined with a gage-wheel, the latter comprising a series of disks or plates bolted together, the colter being secured between said disks, one or more of said disks being on one side of the colter and the remainder of the series of disks being on the other, the colter being changeable, so as to properly align it with the landside, the colter and wheel thus combined being provided with an axle, which is secured to a bracket, and is rotarily adjustable thereon, all as I will now proceed to particularly set forth and claim.

In the accompanying drawings, in the several figures of which like parts are similarly designated, Figure 1 is a side elevation. Fig. 2 is a similar view of the other side. Fig. 3 is a front elevation, and Fig. 4 is a section in the plane of line $x\ x$, Fig. 1.

The colter $a$ may be a disk of any suitable metal. The gage-wheel $b$ is composed of a series of disks or plates, $c$, four (more or less) in number. The colter is preferably stamped or cut out of sheet or plate steel, and the gage-wheel disks may be of cast metal in the shape indicated in Fig. 4. The colter is arranged between the disks $c\ c$, and the disks and colter secured together by bolts $d$ and nuts $e$, passed horizontally through them. A central opening or hub is made in the disks and colter to receive an axle, $f$, having a head or shoulder, $g$, at one end and a pin, $h$, at the other end, a washer, $i$, being interposed between the outer disk and pin $h$, so as to securely hold the disks and colter between the pin and shoulder of the axle, while at the same time permitting the said disks and colter to revolve as one body upon the axle. The head $g$ has a pin or stud, $k$, projecting from it at right angles to the axle to enter a hole in the end of the bracket $l$, the bracket and pin being adjustably secured by a set-screw, $m$, in such manner that the said axle may be set at different angles to or rotarily adjusted upon its pin or stud with respect to the plow.

It will be observed that the series of disks $c\ c\ c\ c$ constitute, when bolted together, the gage-wheel, and when so constructed and the colter combined therewith, as shown, the said colter may be placed between any two of the adjacent disks to properly align said colter with the landside—that is to say, the colter may have one disk on one side and the rest of the series on the other; or it may be placed midway between said disks; or all of said disks may be on one or the other side of said colter; but where it is practicable it is better to have the colter braced on both sides by such disks. The bracket $l$ is slotted and secured to the plow-beam by a bolt and nut, as usual, so as to provide for the vertical adjustment of the colter and gage-wheel.

It will be perceived that the colter and gage-wheel in no wise interfere with the operations of one another, but, on the contrary, that the colter performs its function of cutting the sod, as usual, and the gage-wheel running upon the surface of the sod limits the depth of entrance of the plow into the earth.

The removability of the colter admits of its renewal at any time; also, of its entire removal when it is not desired to use it or when it is desired to employ the gage-wheel alone.

The gage-wheel may be of any desired width by using a greater or less number of disks in its composition. A gage-wheel composed of four disks, each of which is one-half inch wide, will usually suffice.

I am aware that it is not new to secure a circular colter between a two-disk hub, and also that it is not original with me to make a combined gage-wheel and rolling colter, the last-named construction comprising a circular plate of steel sharpened at its periphery, and either bolted between two gage-wheels or by the side of one.

What I claim is—

1. A combined gage-wheel and colter for plows, in which the colter is adjustable to different points of the periphery of said gage-wheel to bring said colter into alignment with the landside of the plow, substantially as set forth.

2. A combined colter and gage-wheel for plows, consisting of a cutting-disk and a series of disks of less diameter to form the gage-wheel, and between which last-named disks the cutting-disk is adjustable, a series of bolts passed through said disks and cutter and secured by nuts, a hub, and an axle fitted in said hub, and on which the cutter and series of disks revolve as a whole, substantially as described.

3. The combined rolling colter and gage-wheel, in combination with the axle $f$, having a stud, $k$, and a bracket, $l$, into which said stud enters, and a set screw, $n$, for permitting the rotary adjustment of the axle on its bracket to bring the gage-wheel and colter into proper position with relation to the plow, substantially as set forth.

In testimony whereof I have hereunto set my hand this 2d day of November, A. D. 1885.

HARRY A. CROSSLEY.

Witnesses:
CHAS. E. FERRELL,
H. HANSCHILD.